3,326,350
LAMP BULB ASSORTING APPARATUS
William R. Cromer, Mattoon, Ill., and Arne Molbach, Ivrea, Italy, assignors to General Electric Company, a corporation of New York
Filed Aug. 18, 1966, Ser. No. 573,255
8 Claims. (Cl. 198—33)

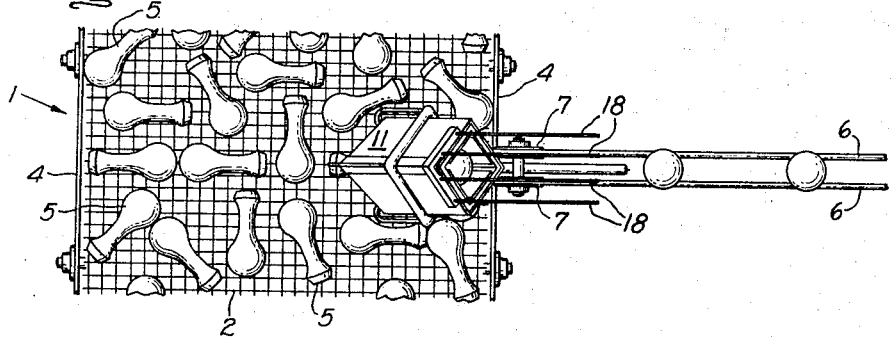
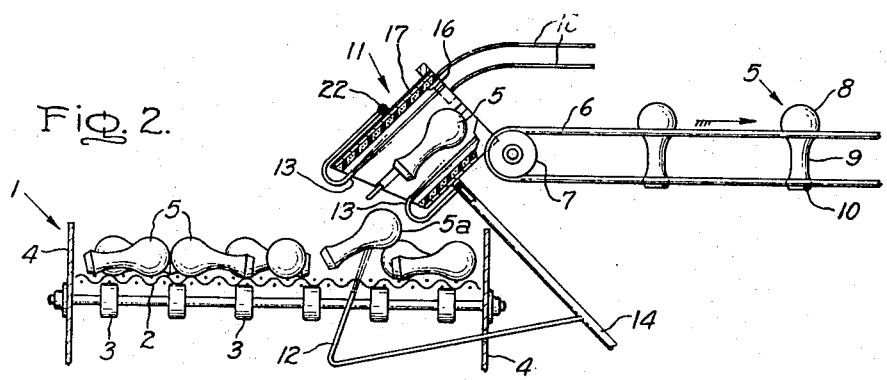
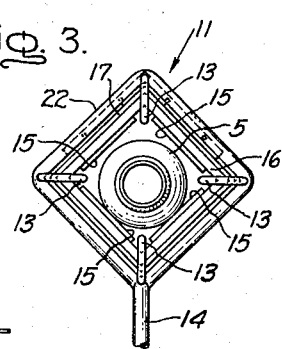
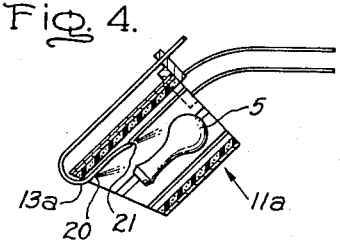

This invention relates to apparatus for assorting or unscrambling glass electric lamp bulbs from a random mass of bulbs and arranging them in an orderly array for delivery to lamp assembly or processing equipment.

It is an object of the invention to provide apparatus which will assort bulbs at high rates of speed, without jamming and with a minimum of breakage, and which is virtually unaffected by the presence of broken glass in the mass of bulbs, and which is of quite simple design.

In accordance with one aspect of the invention, the apparatus comprises means for supporting a random mass of bulbs on a highly foraminous bed, such as a metal mesh or screen conveyor, and circulating them past a given point at which is located an air jet under the said bed and which directs an air column upwardly toward a vacuum pick-up nozzle to raise a bulb off said bed to be pulled into said nozzle and lifted therethrough onto a second conveyor which carries the bulbs away in a single file.

In accordance with a further aspect and a preferred form of the invention, one or more air jets is directed into the nozzle near the mouth thereof. These nozzles serve to continue the air column by creating a vacuum near the mouth of the nozzle and pressure farther up in the nozzle. The result is a remarkably smooth flow of bulbs one at a time, first lifted from the mass by the air jet below it, then pulled by the vacuum into the nozzle, and then driven out of the nozzle by the flow of air in the direction of travel.

Further features and advantages of the invention will appear from the following detailed description of a species thereof and from the drawing wherein:

FIG. 1 is a plan view of apparatus comprising the invention;

FIG. 2 is an elevation, partly in section, of the apparatus shown in FIG. 1;

FIG. 3 is a bottom end view of the pick-up nozzle shown in FIGS. 1 and 2; and

FIG. 4 is a side view, in section, of a modification of the pick-up nozzle.

Referring to FIGS. 1 and 2 of the drawing, there is provided a first conveyor 1 which comprises a highly foraminous bed, preferably a metal mesh member 2, which is supported by and moved along supporting rollers 3 between side plates 4. The conveyor bed 2 carries a random mass of glass electric lamp bulbs 5, preferably around a generally circular path, to recirculate the mass of bulbs past a given pick-up point, or more properly, past a virtually unlimited number of pick-up points at which one or more sorting devices may be located. At one such pick-up point there is located a second conveyor, here illustrated as comprising a conventional pair of spaced belts 6 which extend transversely away from the first conveyor 1 and, at their receiving end, pass around pulleys 7 located adjacent to and above the edge of the first conveyor 1. The conveyor belts 6 support the bulbs 5 from their bulbous (spherical) upper ends 8 (FIG. 2) which taper down to a cylindrical neck portion 9 having an enlarged cullet portion 10 at the bottom thereof.

The bulbs 5 are transferred from conveyor 1 to conveyor belts 6 by a vacuum pick-up nozzle 11 cooperating with an air column created by a small high pressure air jet conduit 12 which is located below the mesh conveyor bed 2 to direct an air jet toward the mouth of the nozzle 11 to raise a bulb 5 off the surface of the conveyor bed 2. As illustrated in FIGS. 1 and 3, the nozzle 11 is of square cross section only slightly larger than the maximum diameter of the bulb bowl 8 and is provided at each interior corner, near its mouth, with a conduit 13 which directs an air jet upwardly through the interior of the nozzle. Said conduits 13 are supplied with compressed air from a manifold 22 connected to a common conduit 14 to which the conduit 12 is also connected.

The nozzle 11 is preferably composed of internal sides 15 (FIG. 3) of thin spring steel which are cemented to foam rubber 16 which is, in turn, cemented to a sheet metal exterior 17. By virtue of this construction, the bulbs slide easily through the nozzle one at a time without jamming or breaking. The nozzle 11 is preferably kept as short as possible for careful bulb handling. With the air jets properly adjusted, the bulbs flow smoothly out of the nozzle 11, bulbous end 8 foremost onto the belt 6; however, as a precautionary measure there may be provided a retaining guide means, here illustrated as a plurality of rod members 18 which project forwardly and horizontally from the upper edges of the nozzle over the conveyor belts 6. The belts 6 remove a bulb quickly before it can be struck by a succeeding bulb coming from the nozzle 11.

It will thus be evident that, in operation, as a bulb 5a (FIG. 2) arrives over the air jet conduit 12, it is raised off the surface of the conveyor bed 2 and pulled into the nozzle 11 by the suction created by air jet conduits 13 and then driven out of the nozzle onto the belts 6 by the flow of air created by said jet conduit 13.

It will be noted that the nozzle 11 is preferably oriented so that one diagonally opposed pair of corners of its square cross section are in a vertical plane aligned with the second conveyor 6. This arrangement permits the designing of a smooth transfer point from the nozzle to the conveyor belts 6.

As illustrated in FIG. 4, the number of air jets in the nozzle 11a may be reduced to a single jet 13a. Where a single jet 13a is used, it is preferably of a tandem type having openings spaced longitudinally therealong at 20 and 21 from which issue a pair of upwardly directed jets. The diagonal orientation of the nozzle permits the reduction in the number of air jets in the corners thereof while still retaining symmetry, as well as providing the smoother nozzle-to-belt transfer point.

The apparatus disclosed herein is capable of operation at speeds of several thousand bulbs per hour. It will be evident that a large number of additional "lanes" comprising nozzles 11 and conveyor belts 6 may be associated with a single supply conveyor 1, and each unit may operate independently of all others for greater reliability. Factory space requirements for bulb sorting are kept to a minimum, and the sorting units are of simple design. The operation of several units or lanes from one bulb source also permits easier automation of bulb handling from shipment unloading through lamp making.

It will be evident to those skilled in the art that various changes may be made in the design and orientation of the suction transfer mechanism within the spirit and scope of the invention as set forth in the appended claims.

What we claim as new and desire to secure by Letters Patent of the United States is:

1. Electric lamp bulb assorting apparatus comprising the combination of conveyor means having a highly foraminous bed for supporting a random mass supply of bulbs and circulating them past a given point, a second conveyor means extending transversely away from the first conveyor means with its receiving end adjacent to and above the edge of said first conveyor means at said given point, said second conveyor means arranged to support and carry said bulbs in a single file, and means to transfer bulbs individually from said first conveyor means to said second conveyor means comprising a nozzle member which is only slightly larger than the maximum diameter of the bulbs and which extends downwardly a short distance from the receiving end of said second conveyor to a position over the bed of said first conveyor, means to create a suction upwardly through said nozzle to draw a bulb therethrough, and means to direct a jet of air upwardly through the bed of said first conveyor toward the mouth of said nozzle to raise a bulb off said first conveyor to be pulled into the nozzle and lifted therethrough onto said second conveyor.

2. Bulb assorting apparatus as set forth in claim 1 wherein said means to create a suction upwardly through said nozzle comprises at least one high pressure air conduit which directs an air jet upwardly within and near the mouth of said nozzle.

3. Bulb assorting apparatus as set forth in claim 2 wherein said conduit has upwardly directed openings spaced along its length to provide jets in tandem.

4. Bulb assorting apparatus as set forth in claim 2 including retaining guide means projecting forwardly and horizontally from the upper edge of said nozzle over said second conveyor means to assist in guiding the bulb onto said second conveyor means.

5. Bulb assorting apparatus as set forth in claim 1 wherein said nozzle is square in cross section and said means to create a suction upwardly therethrough comprises a high pressure air conduit located in at least one corner of the nozzle near the mouth thereof and which directs an air jet upwardly therethrough.

6. Bulb assorting apparatus as set forth in claim 5 wherein said conduit has upwardly directed openings spaced along its length to provide jets in tandem.

7. Bulb assorting means as set forth in claim 5 wherein said square sectioned nozzle is arranged so that one diagonally opposed pair of corners are in a vertical plane aligned with said second conveyor.

8. Bulb assorting apparatus as set forth in claim 1 including retaining guide means projecting forwardly and horizontally from the upper edge of said nozzle over said second conveyor means to assist in guiding the bulb onto said second conveyor means.

References Cited

UNITED STATES PATENTS

| | | | |
|---|---|---|---|
| 2,760,679 | 7/1952 | Chadderton et al. | 198—33 X |
| 3,017,011 | 1/1962 | Meyer | 198—33 |

EVON C. BLUNK, *Primary Examiner.*

M. L. AJEMAN, *Assistant Examiner.*